United States Patent [19]

Gallagher, Jr.

[11] Patent Number: 5,453,139
[45] Date of Patent: Sep. 26, 1995

[54] METHOD OF MAKING COLD FORMED HIGH-STRENGTH STEEL PARTS

[75] Inventor: Hugh M. Gallagher, Jr., Cincinnati, Ohio

[73] Assignee: Consolidated Metal Products, Inc., Cincinnati, Ohio

[21] Appl. No.: 275,602

[22] Filed: Jul. 15, 1994

Related U.S. Application Data

[63] Continuation-in-part of Ser. No. 992,123, Dec. 17, 1992, Pat. No. 5,330,594 which is continuation-in-part of Ser. No. 848,646, Mar. 9, 1992, Pat. No. 5,236,520 which is continuation-in-part of Ser. No. 602,675, Oct. 24, 1990, Pat. No. 5,094,698.

[51] Int. Cl.⁶ ..................................................... C21D 7/02
[52] U.S. Cl. .............................. 148/651; 72/364; 72/700
[58] Field of Search ...................... 72/364, 700; 148/320, 148/651, 650

[56] References Cited

U.S. PATENT DOCUMENTS

| | | |
|---|---|---|
| 1,862,281 | 6/1932 | Schaefer . |
| 2,767,836 | 10/1956 | Nachtman et al. . |
| 2,767,837 | 10/1956 | Nachtman et al. . |
| 2,880,855 | 4/1959 | Nachtman . |
| 2,953,794 | 9/1960 | Klooz . |
| 3,001,897 | 9/1961 | Nachtman . |
| 3,066,408 | 12/1962 | Fader . |
| 3,076,361 | 2/1963 | Epstein et al. . |
| 3,557,587 | 1/1971 | Cardillo . |
| 3,573,999 | 4/1971 | Gokyu . |
| 3,720,087 | 3/1973 | Gottschlich . |
| 3,877,281 | 4/1975 | Shimizu et al. . |
| 3,904,445 | 9/1975 | Gallagher, Jr. . |
| 3,908,431 | 9/1975 | Jones et al. . |
| 4,289,548 | 9/1981 | Bucher et al. . |
| 4,312,210 | 1/1982 | Nishizawa et al. . |
| 4,317,355 | 3/1982 | Hatsuno et al. . |
| 4,608,851 | 9/1986 | Khare . |
| 4,805,437 | 2/1989 | Heil, Jr. et al. . |

FOREIGN PATENT DOCUMENTS

| | | |
|---|---|---|
| 0093218A1 | 11/1983 | European Pat. Off. . |
| 2218399 | 2/1974 | France . |
| 3434743A1 | 4/1986 | Germany . |
| 51-144328A | 12/1976 | Japan . |
| 58-027958 | 2/1983 | Japan . |
| 1535775 | 12/1978 | United Kingdom . |

OTHER PUBLICATIONS

*High–Tensile Bolts* by Kobe Steel, from Chemical Abstracts No. 101411b, vol. 95 (1981.09) No. 12, Sep. 21, 1981, p. 219.
*A New Microalloyed Multi–Phase Steel for High Strength Cold Heading Applications* by C. I. Garcia, A. K. Lis and A. J. DeArdo, from Proceedings of the 60th Annual Convention and 1990 Division Meetings of the Wire Association International Inc., May 1990, pp. 26–30.
*Accelerated Cooling: A Physical Metallurgy Perspective* by A. J. DeArdo, from Canadian Metallurgical Quarterly, vol. 27, No. 2, 1988, pp. 141–154.
*The Deformation Behavior of a Vanadium–Strengthened Dual Phase Steel* by R. G. Davies, from Metallurgical Transactions, vol. 9A, Jan. 1978, pp. 41–52.
*Warm Working of Steel* by Isao Gokyu and Teruo Kishi, from Japanese Inst. of Metal vol. 9, Supp. 1968.
*Strengthening of Warm–Rolled Low–Carbon Steels* by M. L. Bernshtein and N. V. Filatova, from 2354 Metal Science and Heat Treatment 26, Feb. 1, 1984, pp. 128–131.
*Materials Science in Engineering*, Second Edition by Carl A. Keyser, 1974, pp. 236–237.
*Warm Extrusion of Free–Cutting Steels* by E. Nehl, from CA102(22): 888 63K American Chem. Society, 1984.
Saarstahl, Wire and Wire Rods Hardened and Tempered in Coils, Apr. '81.

*Primary Examiner*—Deborah Yee
*Attorney, Agent, or Firm*—Wood, Herron & Evans

[57] ABSTRACT

A method of making high-strength steel parts is disclosed by providing a blank of high-strength steel having a ferrite-pearlite microstructure and high-strength mechanical properties and cold forming the blank by upsetting, forging, or extrusion to provide a part having a desired geometric configuration while the mechanical strength of the part remains substantially the same or greater than the blank.

10 Claims, No Drawings

METHOD OF MAKING COLD FORMED HIGH-STRENGTH STEEL PARTS

This is a continuation-in-part application of U.S. patent application Ser. No. 07/992,123 filed Dec. 17, 1992 and issued as U.S. Pat. No. 5,330,594 which is in turn a continuation in part application of U.S. patent application Ser. No. 07/848,646, filed Mar. 9, 1992, and issued as U.S. Pat. No. 5,236,520 which is, in turn, a continuation-in-part application of U.S. patent application Ser. No. 07/602,675, filed Oct. 24, 1990 and now U.S. Pat. No. 5,094,698, all assigned to the assignee of this application.

FIELD OF THE INVENTION

The present invention relates to a method of making high-strength steel parts, and more particularly, it relates to a method in which a blank of high-strength steel is cold formed into a part having a desired geometric configuration, such that the strength of the part remains substantially the same or greater than the blank.

BACKGROUND OF THE INVENTION

A number of methods have heretofore been used to make steel parts. These methods often employ cold forming techniques, such as upsetting, heading and extrusion, which are well known in the art. In upsetting, the cross-sectional area of a portion or all of a blank of metal is increased. Heading is a particular form of upsetting where the blank is a wire, rod or bar stock. The heads of bolts are often made using heading techniques. In extrusion, the metal blank is forced through a die orifice of desired cross-sectional outline to produce a length of uniform cross section.

One such method for making high-strength steel parts which is well known begins by annealing or otherwise softening the steel blank. The annealed steel blank is then cold formed, in a process which includes one of the above types of forming techniques, into a desired geometric configuration. The now formed part is then heat treated, i.e., austenitized, hardened by quenching followed by tempering, to obtain the desired high-strength mechanical properties. The steel material of the resulting part has a tempered martensite microstructure. The mechanical properties produced from such heat treatments are often inconsistent and can vary widely from part to part. In addition, the annealing and heat treating steps significantly add to the cost of the overall process for making the high-strength steel parts, due in large part to the energy consumption associated with heating the part and the required labor and processing.

In another method for making such high-strength steel parts, the blank of steel is initially austenitized, hardened by quenching followed by tempering to the point where the mechanical properties of the post-heat treated blank are such that the blank can be subsequently cold formed, in a process which includes one of the above three forming techniques, into a desired geometric configuration. The steel material of the finished part from this method also has a tempered martensite microstructure. While this method apparently has advantages over the previously described method in that narrower strength tolerances from part to part have reportedly been obtained, this method still employs a costly heat treating process.

Cold forming blanks of high-strength material is known. In U.S. Pat. No. 3,904,445 issued to the present inventor, a method is disclosed for cold forming a length of high-strength steel bar stock into a U-bolt. The '445 patent discloses such a length of bar stock made of a steel material having a composition consisting essentially of, by weight percent: carbon between about 0.50–0.55%, manganese between about 1.20–1.65%, vanadium between about 0.03–0.05%, with the balance substantially all iron. However, cold forming a bend in a length of bar stock is less severe than other cold forming techniques, such as upsetting and extruding. Until this invention, it was thought that cold forming a blank of high-strength into a part by upsetting or extrusion type techniques would likely result in the formation of cracks or even fractures in the finished high-strength steel part or at the least would likely require the gradual formation of the part by a series of cold forming steps with an annealing or stress relieving step performed between successive cold forming operations. Such cracks or fractures would likely ruin the part. In addition, employing such cold forming and annealing steps would add to the time and cost of making such high strength steel parts.

SUMMARY OF THE INVENTION

There has heretofore been lacking a method of making a high-strength steel part from a blank of steel having a ferrite-pearlite microstructure and possessing desired high-strength properties, which method includes a cold forming step whereby the blank is cold formed by upsetting, forging, or extrusion type techniques into a desired part, with the mechanical strength of the part remaining substantially the same or greater than the strength originally possessed by the blank, and with the part produced with the desired high-strength mechanical properties without the need of heat treatment or additional strengthening steps. The term "blank" as used herein has its usual meaning, i.e., a piece of metal to be cold formed into a finished part of desired geometric configuration. Blanks include such pieces of metal as rods, wires, bar stock and cut lengths thereof (i.e., a piece of steel long in proportion to its width or thickness). The blanks are used to cold form various types of headed or upset shanks, cam rollers, spline shafts, steering arms, nuts, ball joint casings, torsion bars, and other parts according to this invention.

The present invention is directed to a method of making high-strength steel parts from blanks of high-strength steel material having a ferrite-pearlite microstructure and a tensile strength of at least about 120,00 psi and a yield strength of at least about 90,000 psi with the following composition by weight percent: carbon—about 0.30 to about 0.65%, manganese—about 0.30 to about 2.5%, at least 1 grain refiner from the group consisting of aluminum, niobium (i.e., columbium), titanium and vanadium and mixtures thereof, in an amount effective up to about 0.35%, and iron—balance.

In one of its aspects, the present invention provides a method of making high-strength steel parts from such blanks by cold forming the blank using techniques such as upsetting, forging, or extrusion to provide a part having the desired geometric configuration with a ferrite-pearlite microstructure, whereby the mechanical properties of tensile strength and yield strength of the part are substantially the same or greater than the blank.

The present invention also provides a method of making high-strength steel parts which includes cold forming a blank of high-strength steel using such techniques, whereby the mechanical properties of tensile strength and yield strength are substantially the same or greater than the blank and wherein the part, with the desired mechanical properties of tensile strength and yield strength, is produced without the need for further processing steps to improve toughness. Depending at least in part on its geometric configuration, some parts may need to be stress relieved within a temperature range of between about 450° F. to about 1,200° F. in order to raise, lower, or otherwise modify the mechanical properties of the steel part (e.g., tensile strength, yield strength, percent elongation, hardness, percent reduction of area, etc.).

The principles of this invention, its objectives and advantages will be further understood with reference to the following detailed description.

DETAILED DESCRIPTION OF THE INVENTION

The method of the present invention is useful for producing a wide variety of finished high-strength steel parts including various types of headed or upset shanks, cam rollers, spline shafts, steering arms, nuts, ball joint casings, torsion bars, and other parts susceptible to forming by the cold forming process described herein.

In a preferred embodiment, the method of the present invention for making a high-strength steel part includes providing a blank of high-strength steel material having a microstructure of fine pearlite in a ferritic matrix, a tensile strength of at least about 120,000 psi and preferably at least about 150,000 psi, and a yield strength of at least about 90,000 psi, and preferably at least about 130,000 psi. Pearlitic constituents are generally considered to be "fine" when their lamellae are not resolvable at an optical magnification of about 1000 times. In one form, the high-strength steel material utilized as the blank has been hot reduced and cold drawn to provide the blank having the mechanical properties of tensile strength and yield strength stated above.

The high-strength steel material used to make the blank has the following composition, by weight percent:

carbon about 0.30 to about 0.65% manganese about 0.30 to about 2.5% at least 1 ferrous grain refiner from the group consisting of aluminum, niobium, titanium and vanadium, and mixtures thereof, in an effective amount up to about 0.35% iron balance.

In a more preferred form, the high-strength steel material has the following composition, by weight percent:

carbon about 0.40 to about 0.55% manganese about 0.30 to about 2.5% at least 1 ferrous grain refiner from the group consisting of aluminum, niobium, titanium and vanadium and mixtures thereof, in an effective amount up to about 0.20% iron balance In a still more preferred form, the high-strength steel material has the following composition, by weight percent:

carbon about 0.50 to about 0.55% manganese about 1.20 to about 1.65% at least 1 ferrous grain refiner from the group consisting of aluminum, niobium, titanium and vanadium, and mixtures thereof, in an effective amount from about 0.03 to about 0.20% iron balance.

While aluminum, niobium (i.e., columbium), titanium and vanadium act as grain refiners, vanadium is the most preferred of the grain refiners. Furthermore, it should be understood that the compositions listed and claimed herein may include other elements which do not impact upon the practice of this invention.

The blank, having a composition and mechanical properties of tensile strength and yield strength as given above is thereafter cold formed using such techniques as upsetting, forging, or extrusion at a temperature between ambient or room temperature up to less than about 300° F., and preferably at about ambient temperature, to provide a part having a desired geometric configuration, whereby the mechanical properties of tensile strength and yield strength of the part are substantially the same or greater than the blank. The formed part, with the mechanical properties of tensile strength and yield strength given, is preferably produced without the need for further processing steps, such as a final stress relieving step, to improve toughness. However, for certain geometric configurations and applications of the part, a stress relieving step may be necessary.

The blank of high-strength steel material having a tensile strength of at least about 120,000 psi and a yield strength of at least 90,000, which is used as the starting piece in the method of the present invention, is produced by any suitable method known in the art. One such method is disclosed in U.S. Pat. No. 3,904,445 to the present inventor and the specification in its entirety is incorporated herein by reference. The '445 patent discloses a processing sequence to produce a high-strength steel bar stock of the type particularly useful for producing threaded fasteners. In the described process, the bar stock produced has a fine grained structure between about ASTM No. 5–8. In the disclosed process, a steel, having a composition falling within certain disclosed ranges, is subjected to a standard hot reducing operation to within 10%–15% of final gauge. The hot reduced bar stock is then cut or severed into individual lengths for rapid air cooling. Thereafter, the individual lengths of hot reduced bar stock are subjected to a cold finishing to final gauge. The final step is a controlled stress relieving step to increase the mechanical strength properties. This stress relieving step comprises heating the lengths of bar stock to between about 500°–850° F. for about one hour, but may or may not be necessary. Thus, such bar stock, with and without further stress relieving may be used to form the starting high-strength steel blank.

The following example illustrates the practice of the present invention to produce an upset shank from high-strength steel bar stock produced in accordance with the method disclosed in U.S. Pat. No. 3,904,445 described above. The term "upset shank" refers generally to such structure as wire, rod, bar stock, etc. which has some of its length, typically an end, deformed into some form of a head having a cross-sectional area larger than the cross-sectional area of the balance of its length.

EXAMPLE

A round high-strength 1552 steel bar equivalent to grade 8 strength steel, having a diameter of approximately 1" is cut to a length of approximately 12". This stock has a tensile strength of about 152,000 psi and a yield strength of about 138,000 psi, with a ferrite-fine pearlite microstructure and a fine grain structure. The composition of the 1552 steel bar by weight was about 0.50 to 0.55% carbon, about 1.20 to 1.65% manganese, at least one vanadium grain refiner in an amount of about 0.03 to 0.20%, and the balance iron. A steering arm was made from the bar stock segment at about room temperature, the head of the arm is formed by forging, one or more times, one end of each bar stock segment with a shaped die using a mechanical forging press applying approximately 1000 tons of pressure. The head of the resulting arm is approximately 0.6" thick and approximately 1.3" wide. A 0.5" section from the cold formed arm was tested to have a tensile strength of about 155,000 psi and a yield strength of about 143,000 psi.

The mechanical properties of tensile strength and yield strength of the finished steering arm part are substantially the same or greater than that originally possessed by the bar stock, and therefore, no further strengthening processing steps are required. The finished steering arm also has enough of the desired mechanical property of ductility originally possessed by the bar stock that the need for further processing steps to improve toughness can generally be eliminated. However, for certain uses of the steering arm, or other part, a stress relieving step may be necessary. For example, in some applications it is not desirable for a shank to break under its head when pulled in tension. It is usually more desirable for the shank to be the weakest section of the part. In such instances, stress relieving improves the toughness of the part such that it breaks in its shank under tensile loading.

Compared to prior methods which used a heat treating process (i.e., austenitizing, hardening by quenching followed by tempering), especially when the heat treatment was used after cold forming to produce the desired high-strength mechanical properties of the part, finished parts made according to the present invention are more likely to consistently have mechanical properties which fall within a narrower range.

The scope of the present invention is not intended to be limited by the examples provided herein, but rather as defined by the appended claims.

What is claimed is:

1. A method of making a high-strength steel part selected from the group of parts consisting of various types of headed shanks, upset shanks, cam rollers, spline shafts, steering arms, nuts, ball joint casings and torsion bars, comprising the steps of:

providing a blank of high-strength steel material having a ferrite-pearlite microstructure and a tensile strength of at least about 120,000 psi and a yield strength of at least about 90,000 psi that comprises by weight:

carbon about 0.30 to about 0.65% manganese about 0.30 to about 2.5% at least 1 grain refiner from the group consisting of aluminum, niobium, titanium and vanadium, and mixtures thereof, in an effective amount for grain refining up to about 0.35% iron balance; and cold forming said blank by upsetting, forging or extrusion to provide a part selected from the group of parts consisting of various types of headed shanks, upset shanks, cam rollers, spline shafts, steering arms, nuts, ball joint casings and torsion bars, whereby the mechanical properties of tensile strength and yield strength of said part are substantially the same or greater than said blank.

2. The method of claim 1 wherein said part with said mechanical properties are produced without the need for further processing steps to improve toughness.

3. The method of claim 1 wherein the high-strength steel material has previously been hot reduced and cold drawn to provide said blank.

4. The method of claim 1 wherein the blank of high-strength steel material has a tensile strength of at least about 150,000 psi and a yield strength of at least about 130,000 psi.

5. The method of claim 1 wherein the high-strength steel material comprises, by weight percent:

carbon about 0.40 to about 0.55% manganese about 0.30 to about 2.5% at least 1 grain refiner from the group consisting of aluminum, niobium, titanium and vanadium and mixtures thereof, in an effective amount for grain refining up to about 0.20% iron balance.

6. The method of claim 1 wherein the high-strength steel material comprises, by weight percent:

carbon about 0.50 to about 0.55% manganese about 1.20 to about 1.65% at least one grain refiner from the group consisting of aluminum, niobium, titanium and vanadium, and mixtures thereof, in an amount for grain refining from about 0.03 to about 0.20% iron balance.

7. The method of claim 1 wherein said cold forming is carried out at ambient temperature up to less than about 300° F.

8. The method of claim 1 wherein said part with said mechanical properties is subjected to stress relieving within a temperature range between about 450° F. to about 1,200° F. in order to modify the physical characteristics of said part.

9. A method of making a high-strength steel part selected from the group of parts consisting of various types of headed shanks, upset shanks, cam rollers, spline shafts, steering arms, nuts, ball joint casings and torsion bars, comprising the steps of:

providing a blank of high-strength steel material having a ferrite-fine pearlite microstructure, a tensile strength of at least about 120,000 psi and a yield strength of at least about 90,000 psi, which material has previously been hot reduced and cold drawn to provide said blank with said high-strength properties, said high-strength steel comprising, by weight percent:

carbon about 0.50 to about 0.55% manganese about 1.20 to about 1.65% at least one grain refiner from the group consisting of aluminum, niobium, titanium and vanadium, and mixtures thereof, in an effective amount for grain refining up to about 0.20% iron balance; and cold forming said blank by upsetting or extrusion, at ambient temperature to provide a part selected from the group of parts consisting of various types of headed shanks, upset shanks, cam rollers, spline shafts, steering arms, nuts, ball joint casings and torsion bars, whereby the mechanical properties of tensile strength and yield strength of said part are substantially the same or greater than said blank.

10. The method of claim 9 wherein said blank of high-strength steel has a tensile strength of at least about 150,000 psi and a yield strength of at least about 130,000 psi.

* * * * *